United States Patent
Terui et al.

(10) Patent No.: US 7,852,847 B2
(45) Date of Patent: Dec. 14, 2010

(54) RECEIVING APPARATUS AND RECEIVING METHOD

(75) Inventors: Yuichi Terui, Kawasaki (JP); Ichiro Kagami, Kawasaki (JP); Michiko Mizoguchi, Kawasaki (JP); Kyouhei Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 85 days.

(21) Appl. No.: 12/401,660

(22) Filed: Mar. 11, 2009

(65) Prior Publication Data

US 2009/0232135 A1    Sep. 17, 2009

(30) Foreign Application Priority Data

Mar. 14, 2008 (JP) .............................. 2008-066289

(51) Int. Cl.
*H04L 12/28* (2006.01)

(52) U.S. Cl. ...................................... 370/394; 714/748

(58) Field of Classification Search .................. None
See application file for complete search history.

(56) References Cited

FOREIGN PATENT DOCUMENTS

| JP | 2002-218427 | 8/2002 |
|----|-------------|--------|
| JP | 2005-064648 | 3/2005 |
| JP | 2005-198191 | 7/2005 |

*Primary Examiner*—Bob A Phunkulh
(74) *Attorney, Agent, or Firm*—Fujitsu Patent Center

(57) ABSTRACT

A receiving unit receives a group of packets transmitted from a transmitting apparatus. A detecting unit detects a missing packet based on the received group of packets. A first output unit outputs data corresponding to the group of packets, irrespective of a result of the detection by the detecting unit. A transmitting unit transmits a retransmission request for the missing packet to the transmitting apparatus. A re-receiving unit receives the missing packet retransmitted from the transmitting apparatus in response to the retransmission request. A second output unit outputs data corresponding to the group of packets and the retransmitted packet.

8 Claims, 13 Drawing Sheets

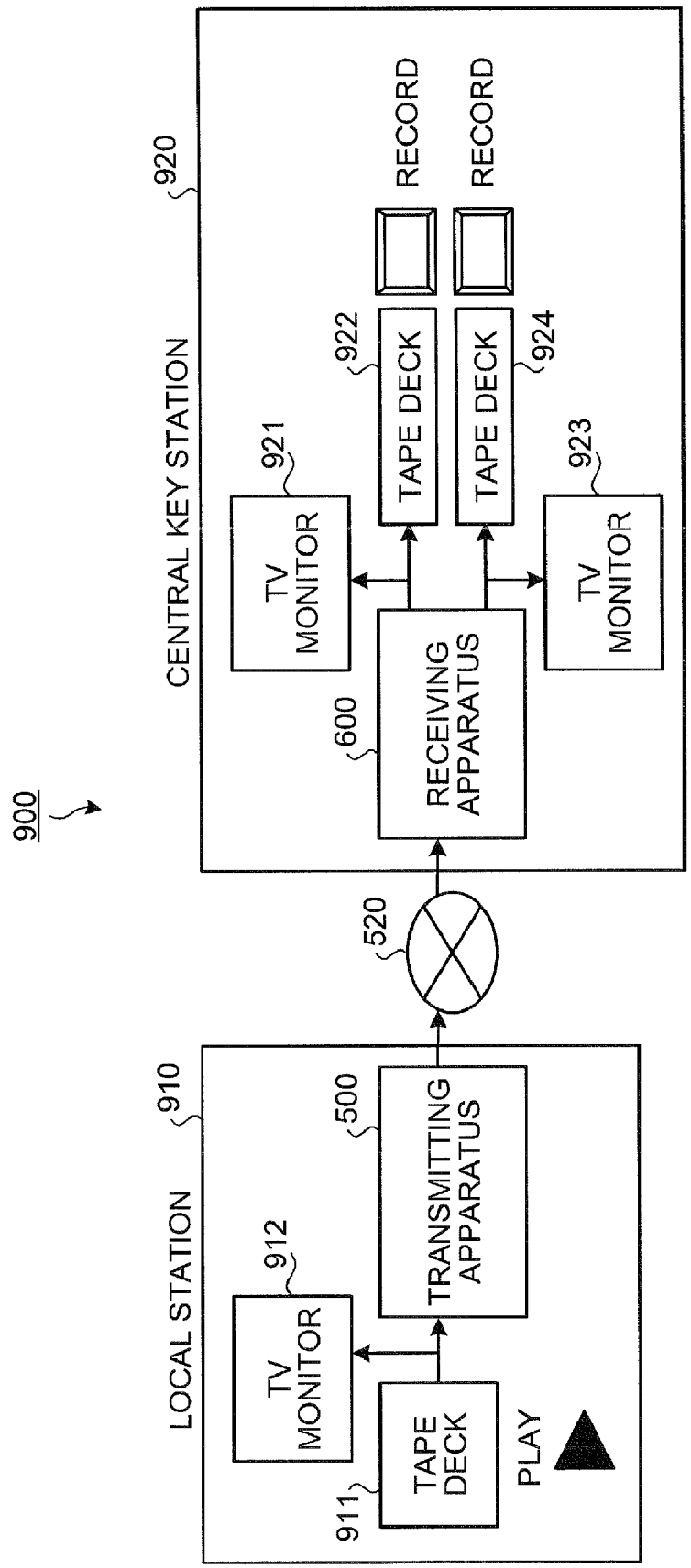

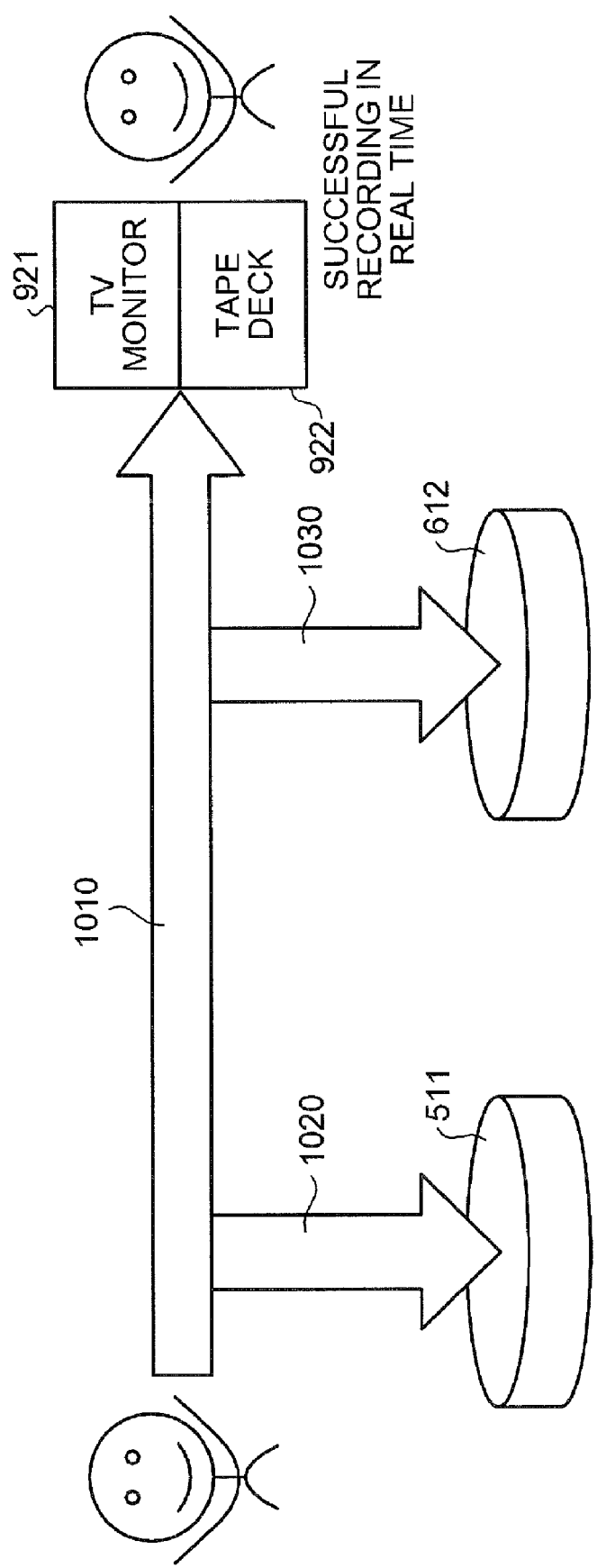

RECEIVING APPARATUS AND RECEIVING METHOD

CROSS-REFERENCE TO RELATED APPLICATIONS

This application is based upon and claims the benefit of priority from the prior Japanese Patent Application No. 2008-066289, filed on Mar. 14, 2008, the entire contents of which are incorporated herein by reference.

BACKGROUND OF THE INVENTION

1. Field of the Invention

The present invention pertains to a receiving apparatus and a receiving method of receiving and outputting data.

2. Description of the Related Art

Recently, the broadband environment has expanded rapidly and correction techniques such as an image compression technique (H.264), Automatic Repeat reQuest (ARQ), and Forward Error Correction (FEC) have progressed remarkably. With this expansion and progress, as with the broadcast industry, even in fields where video transmission quality is important, with regard to news events for which immediacy is given priority, best effort transmission is employed.

Best effort transmission requires less cost than conventional communications with a dedicated line. Best effort transmission uses both ARQ and FEC, a hybrid scheme such as that described in Japanese Patent Application Publication Laid-Open Nos. 2005-64648, 2005-198191, and 2002-218427. For example, when a receiving side notices that a packet is missing, restoration of the missing packet according to FEC is performed and if FEC does not work, ARQ is performed.

In a communication system employing retransmission requests, a sender temporarily stores transmitted packets in a retransmission buffer. When a recipient transmits a retransmission request within a predetermined retransmission period, the sender retrieves the requested packets from the retransmission buffer and transmits the packets to the recipient.

The packets stored in the retransmission buffer are automatically erased after the retransmission period is over. In the best effort scheme, since the transmission of data in real time is of importance, the retransmission period is set to be short. For example, the retransmission period is defined as a period of 300 ms measured from the transmission and storing of packets.

However, according to the conventional techniques, the packets in the retransmission buffer are erased after the retransmission period is over. As a result, missing packets cannot be retransmitted and the quality of decoded data deteriorates on the recipient side with respect to the packets lost.

The sender may packetize the data again and retransmit the data if there are some packets that could not be sent during the retransmission period. In this case, however, all the packetized data must be transmitted, which consumes much time. Particularly, when the data is long-hour media data, retransmission takes a substantial amount of time.

Although the sender may store the packets for a long period of time and increase the retransmission period, the recipient does not output the data until the retransmission period is over. Therefore, since the retransmission period becomes longer and the recipient has to wait longer, consequently, the timeliness of the data in terms of real time is lost.

In addition, the increased the amount of packets stored in the retransmission buffer slows down the retrieval of the packets corresponding to a retransmission request and delays the response of the sender to the request. Consequently, the packets may not be retransmitted within the retransmission period. Further, since packets include a large amount of control information other than the transmission data, the increased amount of packets stored in the retransmission buffer requires an enormous buffer size.

For example, a local broadcast station transmits broadcast material to a central broadcast station and the central broadcast station roughly edits the material. In this case, the content of the material must be recognized swiftly. Further, edited data for broadcasting must be high-quality. However, as explained above, acquiring high-quality broadcast material and swiftly recognizing the content of the materials has been difficult.

It may seem effective to use both a receiving device that acquires low-quality data in real time and a receiving device that has a sufficiently long retransmission period to acquire high-quality data. However, in this case, two transmission systems are needed and the transmission volume doubles.

SUMMARY OF THE INVENTION

It is an object of the present invention to at least solve the above problems in the conventional technologies.

A receiving apparatus according to one aspect of the present invention includes a receiving unit that receives a group of packets from a transmitting apparatus; a detecting unit that detects a missing packet based on the group of packets; a first output unit that outputs data corresponding to the group of packets, irrespective of a detection result obtained by the detecting unit; a transmitting unit that transmits to the transmitting apparatus, a request for retransmission of the missing packet; a re-receiving unit that receives a packet retransmitted from the transmitting apparatus in response to the request; and a second output unit that the outputs data corresponding to the group of packets and the packet received by the re-receiving unit.

A receiving apparatus according to another aspect of the present invention includes a receiving unit that receives a group of packets transmitted from a transmitting apparatus; a first detecting unit that detects, based on the group of packets, packets that have not been received by the receiving unit; a first transmitting unit that transmits to the transmitting apparatus, a first request for retransmission of the packets that have not been received by the receiving unit; a first re-receiving unit that receives packets retransmitted from the transmitting apparatus in response to the first request; a second detecting unit that detects, based on the packets received by the first re-receiving unit, a packet that has not been received by the first re-receiving unit and for which retransmission has been requested; a first output unit that outputs data corresponding to the group of packets and the packets received by the first re-receiving unit, irrespective of a detection result obtained by the second detecting unit; a second transmitting unit that transmits to the transmitting apparatus, a second request for retransmission of the packet that has not been received by the first re-receiving unit; a second re-receiving unit that receives a packet retransmitted from the transmitting apparatus in response to the second request; and a second output unit that outputs the data corresponding to the group of packets, the packets received by the first re-receiving unit, and the packet received by the second re-receiving unit.

A receiving method according to still another aspect of the present invention includes receiving a group of packets from a transmitting apparatus; detecting a missing packet based on the group of packets; outputting data corresponding to the group of packets, irrespective of a detection result obtained at the detecting; transmitting to the transmitting apparatus, a request for retransmission of the missing packet; re-receiving a packet retransmitted from the transmitting apparatus in response to the request; and outputting the data corresponding to the group of packets and the packet received at the re-receiving of the packet.

A receiving method according to yet another aspect of the present invention includes receiving a group of packets transmitted from a transmitting apparatus; detecting, based on the group of packets, packets that have not been received at the receiving; transmitting to the transmitting apparatus, a first request for retransmission of the packets that have not been received at the receiving; re-receiving packets retransmitted from the transmitting apparatus in response to the first request; detecting, based on the packets received at the first re-receiving, a packet that has not been received at the first re-receiving and for which retransmission has been requested; outputting data corresponding to the group of packets and the packets received at the re-receiving of the packets retransmitted in response to the first request, irrespective of a detection result obtained by the second detecting unit; transmitting to the transmitting apparatus, a second request for retransmission of the packet that has not been received at the re-receiving of the packets retransmitted in response to the first request; re-receiving a packet retransmitted from the transmitting apparatus in response to the second request; and outputting the data corresponding to the group of packets, the packets received at the re-receiving of the packets retransmitted in response to the first request, and the packet received at the re-receiving of the packet retransmitted in response to the second request.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 9 is a diagram of one example of the transmitting apparatus and the receiving apparatus;

FIG. 10 is a diagram of communications under the communications system depicted in FIG. 9;

DETAILED DESCRIPTION OF THE PREFERRED EMBODIMENTS

Referring to the accompanying drawings, exemplary embodiments according to the present invention are explained in detail below.

Figure 1:
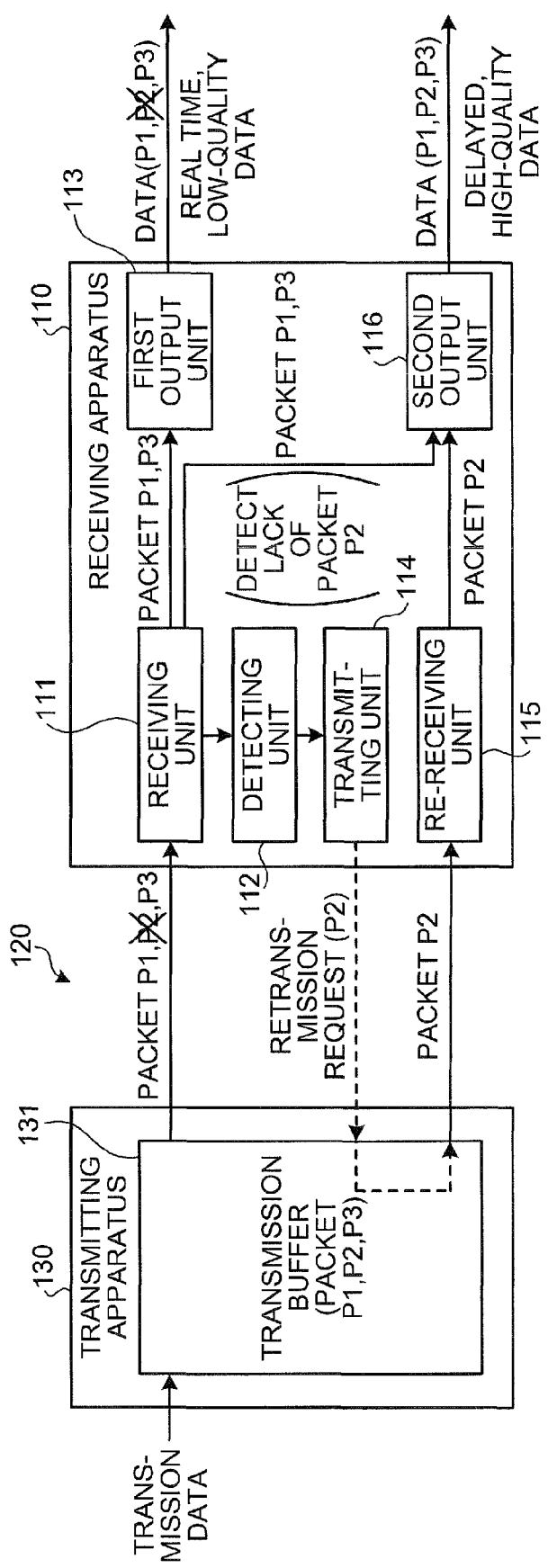
FIG. 1 is a block diagram of a receiving apparatus.

FIG. 1 is a block diagram of a receiving apparatus. In FIG. 1 and subsequent figures, an arrow indicates data flow and a dotted arrow indicates flow of control signals. As depicted in FIG. 1, a receiving apparatus 110 receives packets from a transmitting apparatus 130 via a network 120. Data to be sent to the receiving apparatus 110 is input to the transmitting apparatus 130.

The transmitting apparatus 130 includes a transmission buffer 131 that stores a packet group, packetized data (P1, P2, P3). The transmitting apparatus 130 sequentially transmits packets P1, P2, P3 stored in the transmission buffer 131 to the receiving apparatus 110. Even after transmitting the packets P1, P2, P3 to the receiving apparatus 110, the transmitting apparatus 130 stores the packets P1, P2, P3 in the transmission buffer 131 until a retransmission period is over.

If the transmitting apparatus 130 receives a retransmission request from the receiving apparatus 110 within the retransmission period, the transmitting apparatus 130 selects from among the packets P1, P2, P3 stored in the transmission buffer 131, a packet(s) corresponding to the retransmission request and retransmits the packet(s) to the receiving apparatus 110. It is assumed here that the packet P2 among the packets P1, P2, P3 is lost in the network 120.

The data transmitted by the transmitting apparatus 130 is, for example, media data. The media data includes at least one of image data and audio data. Here, the packets P1, P2, P3 are a packet group at a heading portion of the media data. After transmitting the packets P1, P2, P3, the transmitting apparatus 130 transmits packets corresponding to the remaining portion of the media data to the receiving apparatus 110 according to the best effort scheme.

The receiving apparatus 110 includes a receiving unit 111, a detecting unit 112, a first output unit 113, a transmitting unit 114, a re-receiving unit 115, and a second output unit 116. The receiving unit 111 sequentially receives packets of a packet group transmitted from the transmitting apparatus 130. Here, since the packet P2 has been lost, the receiving unit 111 receives the packets P1 and P3. The receiving unit 111 outputs the received packets to the detecting unit 112, the first output unit 113, and the second output unit 116.

Based on the packets P1 and P3 output from the receiving unit 111, the detecting unit 112 detects a missing packet(s) that has been transmitted from the transmitting apparatus 130 but not received by the receiving unit 111. Here, the detecting unit 112 detects the packet P2 as a missing packet. The detecting unit 112 outputs to the transmitting unit 114, information identifying the packet P2. The information identifying the packet P2 is, for example, a sequence number of the packet P2.

For example, the detecting unit 112 checks the continuity of the sequence numbers of the packets P1 and P3 and detects the packet P2 which must have been transmitted with the packets P1 and P3 from the transmitting apparatus 130. The packets P1 and P3 may include information concerning the number of packets in the packet group (P1, P2, P3) or information concerning sequence numbers and the detecting unit 112 may refer to the information to detect a missing packet.

The first output unit 113 outputs, irrespective of a result of the detection of the detecting unit 112, data of the packets P1 and P3 received from the receiving unit 111 to a destination outside of the apparatus. Since the heading portion of the media data is divided into the packets P1, P2 and P3, the lack of the packet P2 partially debases quality of data (P1, P2, P3) output from the first output unit 113.

Each time the receiving unit 111 outputs a group of packets, the first output unit 113 outputs data based on the group of packets. While the transmitting apparatus 130 sequentially transmits packets of the media data according to the best effort scheme, the first output unit 113 continues to output the media data in real time.

The transmitting unit 114 transmits to the transmitting apparatus 130 a retransmission request for the packet P2 which is indicated by the information from the detecting unit 112. The re-receiving unit 115 receives the packet P2 retransmitted from the transmitting apparatus 130 in response to the retransmission request from the transmitting unit 114. The re-receiving unit 115 outputs the packet P2 to the second output unit 116.

The second output unit 116 outputs data of the packets P1 and P3 output from the receiving unit 111 and the packet P2 output from the re-receiving unit 115. In this way, the second output unit 116 outputs data that has a delay but is higher in quality compared with the data from the first output unit 113. In other words, the second output unit 116 outputs the media data of the packets P1, P2, P3 in a complete condition.

The second output unit 116 outputs the same data as the first output unit 113 but with higher quality than the first output unit 113. For example, while the first output unit 113 keeps output the media data in real time, the second output unit 116 continues to output the same media data of a higher quality with a certain amount of delay with respect to the first output unit 113.

The amount of delay is determined by the time taken for the detecting unit 112 to detect, as a missing packet, the packet P2, the re-receiving unit 115 to receive the packet P2 retransmitted from the transmitting apparatus 130 in response to the retransmission request from the transmitting unit 114, and the second output unit 116 to output the media data of the packet P2.

The first output unit 113 and the second output unit 116 each output media data that are originally the same. Consequently, the first output unit 113 and the second output unit 116 output the media data including information concerning a common play point. The information concerning a common play point is information such as a time stamp indicating a point from which the media data is played.

Figure 2:
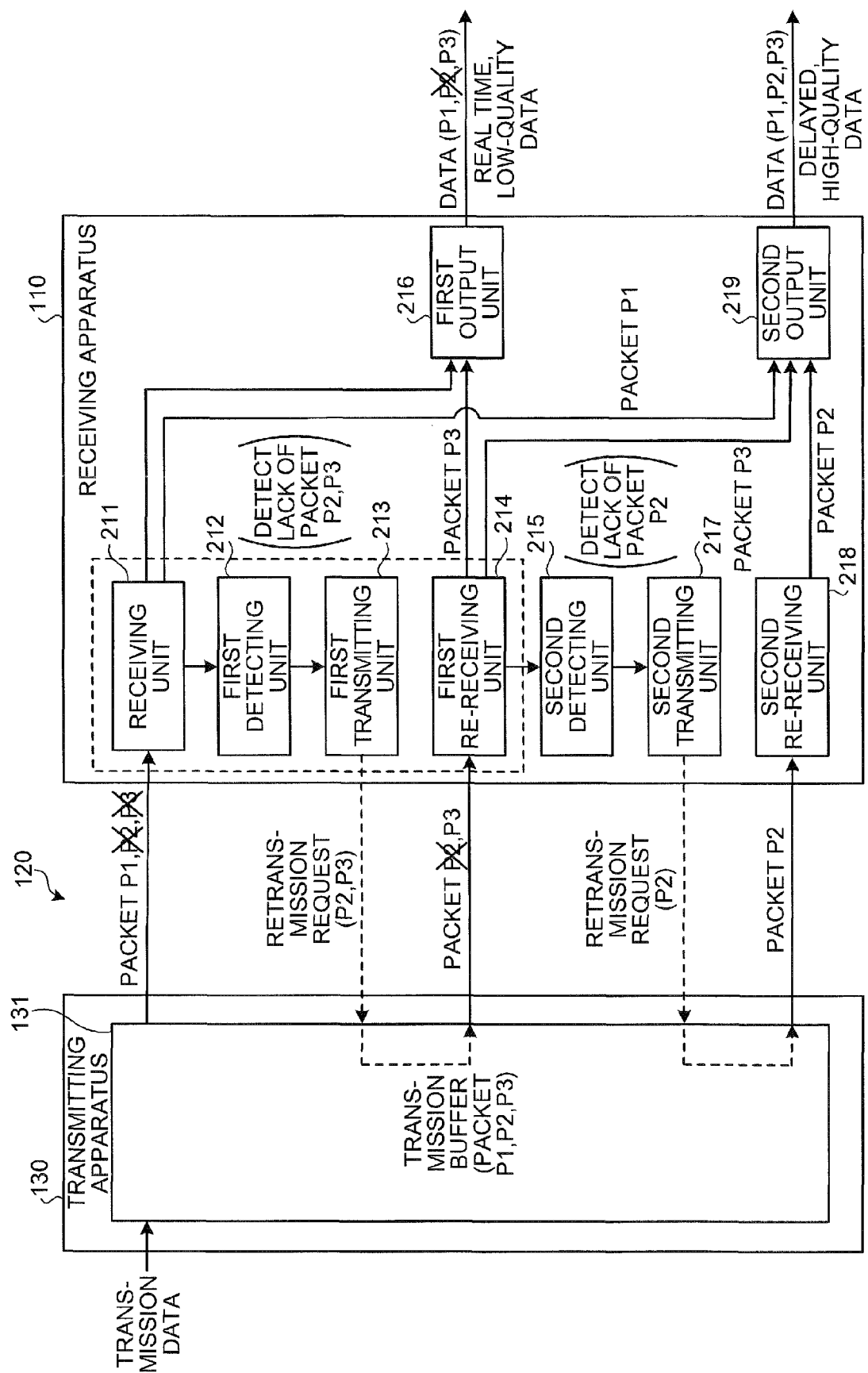
FIG. 2 is another block diagram of the receiving apparatus.

FIG. 2 is another block diagram of the receiving apparatus. The receiving apparatus depicted in FIG. 2 is another example of the receiving apparatus 110 depicted in FIG. 1. As depicted in FIG. 2, the receiving apparatus 110 includes a receiving unit 211, a first detecting unit 212, a first transmitting unit 213, a first re-receiving unit 214, a second detecting unit 215, a first output unit 216, a second transmitting unit 217, a second re-receiving unit 218, and a second output unit 219.

The receiving unit 211, the first detecting unit 212, the first transmitting unit 213, and the first re-receiving unit 214, which are encompassed by a dotted line, correspond to the receiving unit 111 depicted in FIG. 1. The receiving unit 211 sequentially receives packets from the transmitting apparatus 130. It is assumed here that the packets P2 and P3 among the packets P1, P2, P3 transmitted from the transmitting apparatus 130 are lost in a network 120. The receiving unit 211 receives the packet P1. The receiving unit 211 outputs the packet P1 to the first output unit 216, the first detecting unit 212, and the second output unit 219.

Based on the packet P1 output from the receiving unit 211, the first detecting unit 212 detects a missing packet(s) that has been transmitted from the transmitting apparatus 130 but not received by the receiving unit 211. The first detecting unit 212 detects the packets P2 and P3 as missing packets and outputs information concerning the detected packets to the first transmitting unit 213.

The first transmitting unit 213 transmits to the transmitting apparatus 130 a retransmission request for the packets P2 and P3 indicated by the information from the first detecting unit 212. Here, the transmitting apparatus 130 retransmits the packets P2 and P3 in response to the retransmission request but the packet P2 is lost in the network 120. The first receiving unit 214 receives the packet P3 retransmitted from the transmitting apparatus 130. The first re-receiving unit 214 outputs the packet P3 to the second detecting unit 215, the first output unit 216 and the second output unit 219.

The second detecting unit 215 corresponds to the detecting unit 112 depicted in FIG. 1. Based on the packet P3 output from the first re-receiving unit 214, the second detecting unit 215 detects a missing packet(s) that has been re-transmitted from the transmitting apparatus 130 but not received by the first re-receiving unit 214. The second detecting unit 215 detects the packet P2 as a missing packet and outputs information concerning the packet P2 to the second transmitting unit 217.

The first output unit 216 corresponds to the first output unit 113 depicted in FIG. 1. The first output unit 216 outputs data of the packet P1 from the receiving unit 211 and the packet P3 from the first re-receiving unit 214 to a destination outside of the apparatus. The lack of the packet P2 among the packet group (P1, P2, P3) partially debases the data (P1, P2, P3) output from the first output unit 216.

The second transmitting unit 217 corresponds to the transmitting unit 114 depicted in FIG. 1. The second transmitting unit 217 transmits to the transmitting apparatus 130 a retransmission request for the packet P2 indicated by the information from the second detecting unit 215. The second re-receiving unit 218 corresponds to the re-receiving unit 115 depicted in FIG. 1. The second re-receiving unit 218 receives the packet P2 retransmitted from the transmitting apparatus 130 in response to the retransmission request and outputs the packet P2 to the second output unit 219.

The second output unit 219 outputs data of the packet P1 from the receiving unit 211, the packet P3 from the first re-receiving unit 214, and the packet P2 from the second re-receiving unit 218. In this way, the second output unit 219 outputs delayed but higher quality data than the data from the first output unit 216.

The first output unit 216 outputs data after the first re-receiving unit 214 receives packets. Therefore, a first stand-by period is set shorter to preserve a real time characteristic of the data from the first output unit 216 where the first stand-by period starts upon transmission of the retransmission request and ends upon receipt of packets retransmitted from the transmitting apparatus 130 in response to the retransmission request. After the first stand-by period is over, the second detecting unit 215 detects a missing packet(s) that has not been received by the first re-receiving unit 214.

The second output unit 219 outputs data after the second re-receiving unit 218 receives packets but the second output unit 219 give greater priority to quality than the real time characteristic. Therefore, a period A is set long enough to receive retransmitted packets without failure. The period A starts upon transmission of a retransmission request from the second transmitting unit 217 and ends upon receipt of retransmitted packets from the transmitting apparatus 130 by the second re-receiving unit 218.

A second stand-by period starts upon transmission of a retransmission request from the first transmitting unit 213 and continues until the second re-receiving unit 218 receives packets retransmitted from the transmitting apparatus 130. Therefore, the second stand-by period includes both the first stand-by period and the period A, thereby exceeding the first stand-by period.

The first output unit 216 outputs data of packets received during the first stand-by period and thus outputs the received data in real time. The second output unit 219, on the other hand, outputs data of packets received during the second stand-by period, which is longer than the first stand-by period and thus outputs high-quality data.

Figure 3:
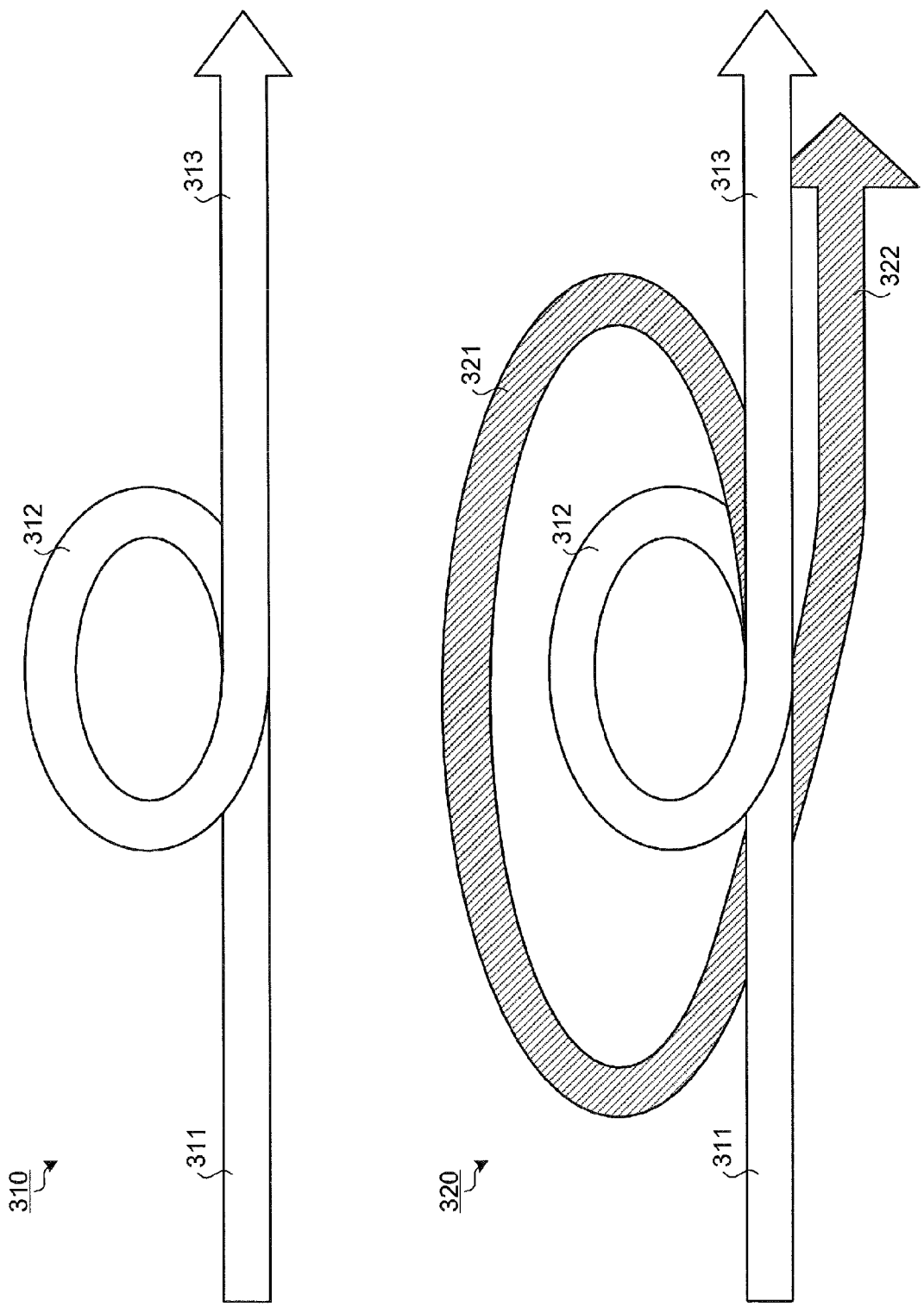
FIG. 3 is a diagram of processing by the receiving apparatus.

FIG. 3 is a diagram of processing by the receiving apparatus depicted in FIG. 2. Numeral 310 indicates a conventional receiving process. Numeral 320 indicates a receiving process of the receiving apparatus 110 depicted FIG. 2. It is assumed here that a conventional receiving apparatus and the receiving apparatus 110 use the best effort scheme. The conventional receiving process of numeral 310 includes a receiving process 311, a re-receiving process 312 and an output process 313.

The receiving process 311 receives media data from a transmitting apparatus. The re-receiving process 312 re-receives part of the media data that could not be received normally among the media data received at the receiving process 311. The output process 313 corrects the media data received at the receiving process 311 with reference to the data received at the re-receiving process 312, and outputs the corrected data.

In order to preserve the real time characteristic of the media data from the output process 313, the processing time of the re-receiving process 312 is set shorter. Specifically, a stand-by period is set shorter where the stand-by period starts from transmission of a retransmission request to the transmitting apparatus and lasts until retransmitted data from the transmitting apparatus is received. After the stand-by period is over, the output process 313 outputs media data of a degraded quality even if data is not re-received in the re-receiving process 312.

On the other hand, the receiving process of the receiving apparatus 110 indicated by numeral 320 includes a receiving process 311, a re-receiving process 312, an output process 313, re-receiving process 321, and an output process 322. Since the receiving process 311, the re-receiving process 312 and the output process 313 are similar as the process 310, a detailed explanation thereof is omitted.

The re-receiving process 321 re-receives part of the media data that has been received at the receiving process 311 but not received normally. The processing time of the re-receiving process 321 is set longer than the processing time of the re-receiving process 312. Specifically, a stand-by period (period A), starting from transmission of a retransmission request to the transmitting apparatus and lasting until retransmitted data is received, is set longer than the stand-by period of the re-receiving process 312 (a first stand-by period).

The output process 322 corrects the media data received at the receiving process 311 based on the data received at the re-receiving process 321, and outputs the corrected data. The data from the output process 322 is delayed but high-quality data in comparison with the data from the output process 313. Thus, the receiving apparatus 110 performs both a shorter retransmitting process of the re-receiving process 312 and a longer retransmitting process of the re-receiving process 321, thereby outputting two types of media data each reflecting results of each retransmitting process.

Figure 4:
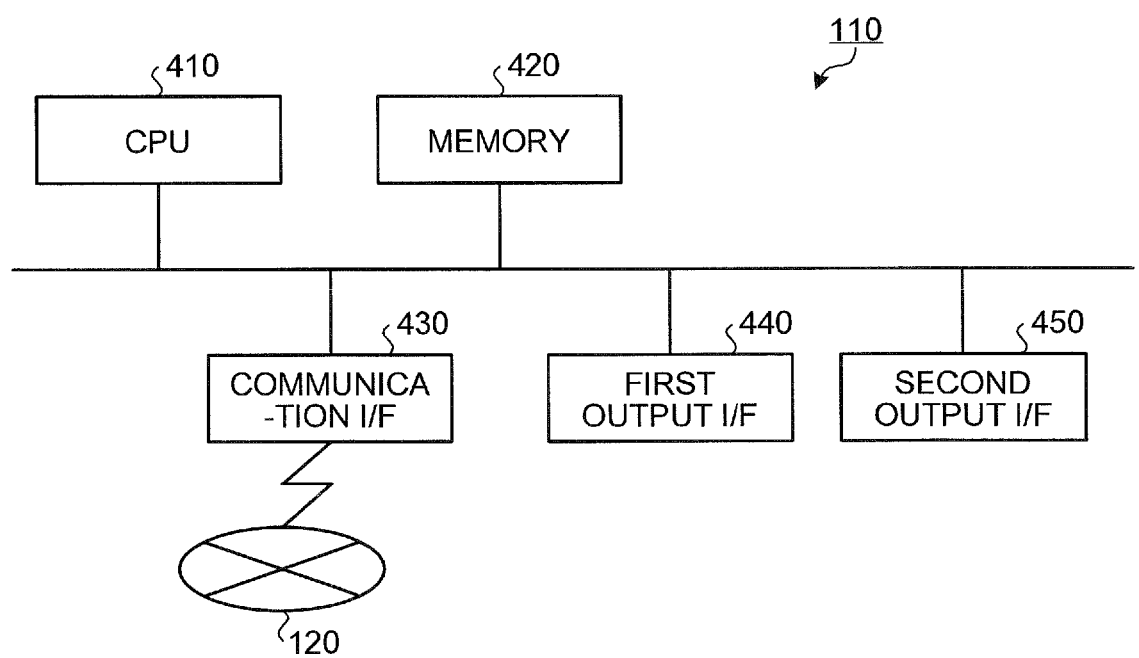
FIG. 4 is a diagram of a hardware configuration of the receiving apparatus.

FIG. 4 is a diagram of a hardware configuration of the receiving apparatus. As depicted in FIG. 4, the receiving apparatus 110 includes a CPU 410, memory 420, a communication interface 430 (communication I/F), a first output interface 440 (a first output I/F), and a second output interface 450 (a second output I/F). The CPU 410 governs overall control. For example, the detecting unit 112 depicted in FIG. 1, the first detecting unit 212 and the second detecting unit 215 depicted in FIG. 2 are the CPU 410.

The memory 420 includes read only memory (ROM), random access memory (RAM), hard disk (HD), an optical disc, flash memory, etc. The memory 420 is used as a work area of the CPU 410. The memory 420 stores various kinds of programs which are loaded according to instructions of the CPU 410.

The communication interface 430 establishes communications with the transmitting apparatus 130 (see FIG. 1 or FIG. 2) via the network 120, and transmits packets to or receives packets from the transmitting apparatus 130. The receiving unit 111, the transmitting unit 114, the re-receiving unit 115 depicted in FIG. 1 and the receiving unit 211, the first transmitting unit 213, the first re-receiving unit 214, the second transmitting unit 217 and the re-receiving unit 218 depicted in FIG. 2 are, for example, the communication interface 430. The communication interface 430 may be a network interface card (NIC).

The first output interface 440 and the second output interface 450 output data such as media data. For example, each of the first output interface 440 and the second output interface 450 may be an output terminal of a housing of the receiving apparatus 110, or a monitor or speaker for playing the media data.

Each of the first output interface 440 and the second output interface 450 may be a recording medium such as a tape deck storing the media data. The first output unit 113 depicted in FIG. 1 and the first output unit 216 depicted in FIG. 2 are, for example, the first output interface 440. The second output unit 116 depicted in FIG. 1 and the second output unit 219 depicted in FIG. 2 are, for example, the second output interface 450.

The first output interface 440 and the second output interface 450 are separately explained in the above explanation but an output interface that selects one of the outputs from the first output unit 113 and the second output unit 116 (or the first output unit 216 and the second output unit 219) may be added. In this case, a switch is provided for a user to select an output.

As a result, the user operates the switch to select the output of the first output unit 113 (or the first output unit 216) to quickly grasp the contents of the data. When the user hopes to obtain high-quality data even with delay, the user selects the output of the second output unit 116 (or the second output unit 219). In this way, the user can obtain an output suitable for her/his needs.

Figure 5:
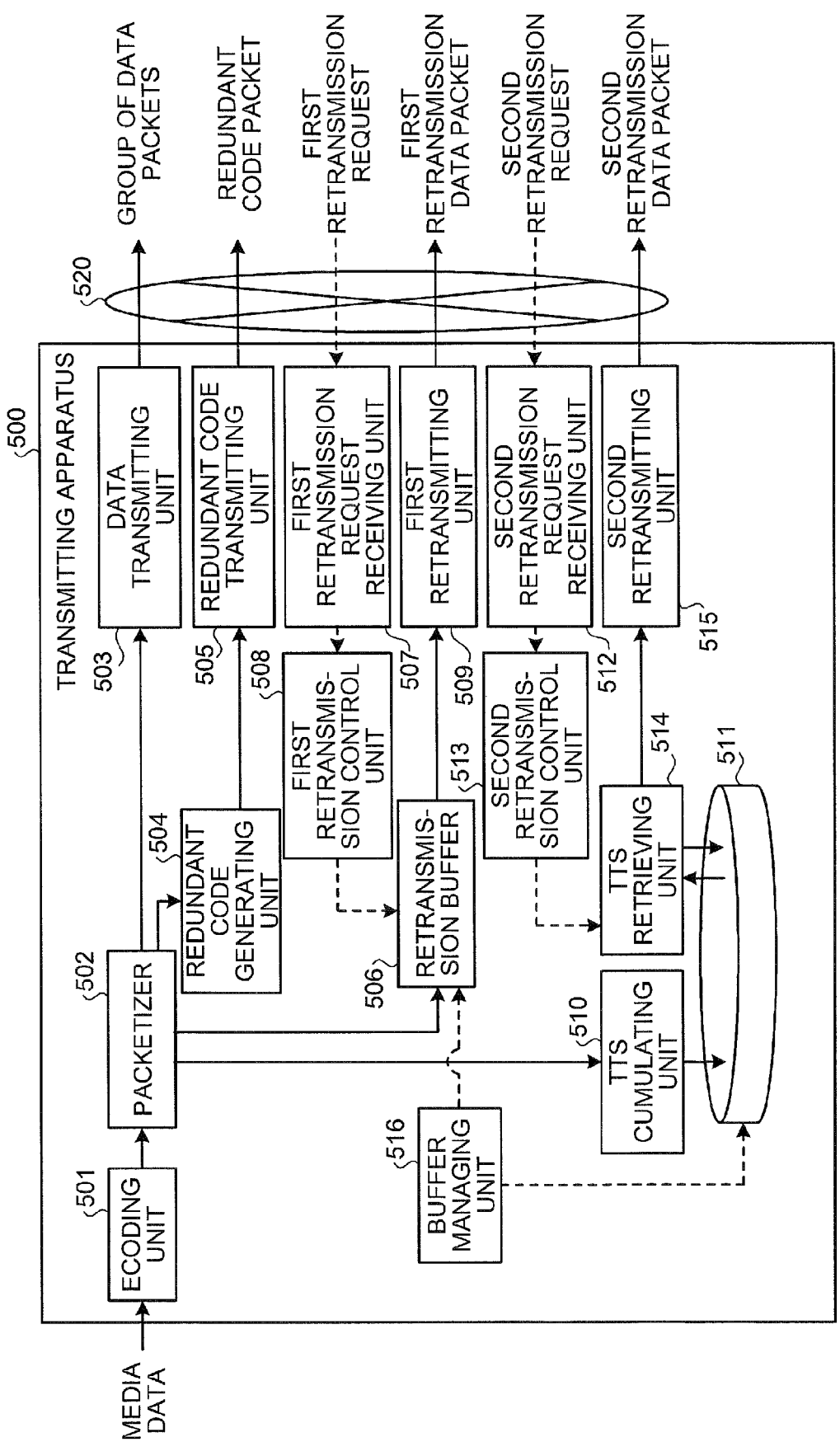
FIG. 5 is a block diagram of a functional configuration of a transmitting apparatus.

FIG. 5 is a block diagram of a functional configuration of a transmitting apparatus. A transmitting apparatus 500 includes an encoding unit 501, a packetizer 502, a data transmitting unit 503, a redundant code generating unit 504, a redundant code transmitting unit 505, a retransmission buffer 506, a first retransmission request receiving unit 507, a first retransmission control unit 508, a first retransmitting unit 509, a time-stamped transport stream (TTS) cumulating unit 510, a cumulating medium 511, a second retransmission request receiving unit 512, a second retransmission control unit 513, a TTS retrieving unit 514, a second retransmitting unit 515, and a buffer managing unit 516.

The transmitting unit 500 corresponds to the transmitting unit 130 depicted in FIG. 1 or FIG. 2. The encoding unit 501 encodes media data. The encoding unit 501 outputs encoded data to the packetizer 502.

The packetizer 502 generates a data packet based on the encoded data output from the encoding unit 501. The packetizer 502 divides the encoded data into data segments of a given size and adds control information to each data segment to generate a data packet. The control information is, for example, address information of the data packet or a sequence number used to regenerate the original encoded data from the data packets.

The packetizer 502 further generates TTS packets based on the encoded data from the encoding unit 501. The packetizer 502 divides the encoded data into data segments of a given size (for example 188 bytes) and adds time stamp information (for example, four bytes) to each data segment to generate a TTS packet.

The time stamp information indicates from where the data of the TTS packet is played with respect to all of the media data. The packetizer 502 outputs generated data packets to the data transmitting unit 503, the redundant code generating unit 504, and the retransmission buffer 506. The packetizer 502 outputs generated TTS packets to the TTS cumulating unit 510.

The data transmitting unit 503 transmits the data packets from the packetizer 502 to the receiving apparatus (see a receiving apparatus 600 depicted in FIG. 6) via a network 520. The network 520 may be a wired network of, for example, optical fibers, or may be a wireless network, or may be a network including both the wired and wireless network.

The redundant code generating unit 504 generates redundant code based on the data packet from the packetizer 502. The redundant code is used for restoring a missing packet on a recipient side. The redundant code is generated based on a result of calculation using the data packets from the packetizer 502. The redundant code generating unit 504 adds control information to the generated redundant code and packetizes the information and the code.

The control information added to the redundant code is, for example, address information for the redundant code (identical to that of the data packet group corresponding to the redundant code), or information used to identify a data packet group corresponding to the redundant code. The redundant code generating unit 504 outputs a redundant code packet to the redundant code transmitting unit 505. The redundant code transmitting unit 505 transmits the redundant code packet from the redundant code generating unit 504 to the receiving apparatus via the network 520.

The retransmission buffer 506 temporarily stores the data packets output from the packetizer 502. The retransmission buffer 506 outputs the stored data packets to the first retransmitting unit 509 under the control of the first retransmission control unit 508. The retransmission buffer 506 erases stored data packets under the control of the buffer managing unit 516.

The first retransmission request receiving unit 507 receives a first retransmission request from the receiving apparatus via the network 520. The first retransmission request received by the first retransmission request receiving unit 507 includes information that indicates a data packet used to request retransmission from the transmitting apparatus 500. The first retransmission request receiving unit 507 outputs the first retransmission request to the first retransmission control unit 508.

The first retransmission control unit 508 controls the retransmission buffer 506 in response to the first retransmission request output from the first retransmission request receiving unit 507. The first retransmission control unit 508 directs the retransmission buffer 506 to output a data packet indicated by the first retransmission request to the first retransmitting unit 509. The first retransmitting unit 509 transmits, as a first retransmitted data packet, the data packet output from the retransmission buffer 506 to the receiving apparatus via the network 520.

The TTS cumulating unit 510 cumulates the TTS packet output from the packetizer 502 in the cumulating medium 511. The cumulating medium 511 stores the TTS packet as a transport stream. The cumulating medium 511 further erases the cumulated transport stream under the control of the buffer managing unit 516.

The second retransmission request receiving unit 512 receives a second retransmission request from the receiving apparatus via the network 520. The second retransmission request received by the second retransmission request receiving unit 512 includes information concerning a time stamp of a transport stream. The second retransmission request receiving unit 512 outputs the second retransmission request to the second retransmission control unit 513.

The second retransmission control unit 513 outputs the information concerning the time stamp included in the second retransmission request output from the second retransmission request receiving unit 512 to the TTS retrieving unit 514. The TTS retrieving unit 514 retrieves a TTS packet corresponding to the time stamp indicated by the information output from the second retransmission control unit 513 from among transport streams cumulated in the cumulating medium 511.

The TTS retrieving unit 514 outputs the retrieved TTS packet to the second retransmitting unit 515. The second retransmitting unit 515 outputs, as a second retransmitted data packet, the TTS packet output from the retransmission buffer 506 to the receiving apparatus via the network 520.

The buffer managing unit 516 erases the data packet stored in the retransmission buffer 506 after a first retention period is over. Consequently, even if the size of the retransmission buffer 506 is not large, the retransmission buffer 506 can store data packets coming from the encoding unit 501 one after another. In addition, reduction of the amount of data packets stored in the retransmission buffer 506 enables faster retrieval of the data packet corresponding to the first retransmission request.

The first retention period is a period in which the first retransmission request may be transmitted from the receiving apparatus. The first retention period is set with respect to the first stand-by period of the receiving apparatus (see FIG. 6). The buffer managing unit 516 erases the transport stream stored in the cumulative medium 511 after a second retention period is over. The second retention period is set longer than the first retention period.

The second retention period is a period in which the second retransmission request may be transmitted from the receiving apparatus. The second retention period is set with respect to the second stand-by period of the receiving apparatus (see FIG. 6). The erasure of data packets in the retransmission buffer 506 after the lapse of the first retention period enables faster retrieval of the data packet corresponding to the first retransmission request and further enables a decrease in the size of the retransmission buffer 506.

Transport streams are stored in the cumulating medium 511 in addition to the retransmission buffer 506. As a result, even if transmission of the first retransmitted data packet fails, a corresponding TTS packet can be retrieved from a transport stream and transmitted as the second retransmission data. In this way, transmission volume is reduced and transmission speed is improved compared to a case where media data is re-packetized and all the packets are retransmitted.

The data size of a TTS packet is smaller than the data size of a data packet since the TTS packet does not include address information or a sequence number. Consequently, storing media data in the cumulating medium 511 as a transport stream decreases the amount of data to be stored in comparison with storing media data as data packets.

Figure 6:
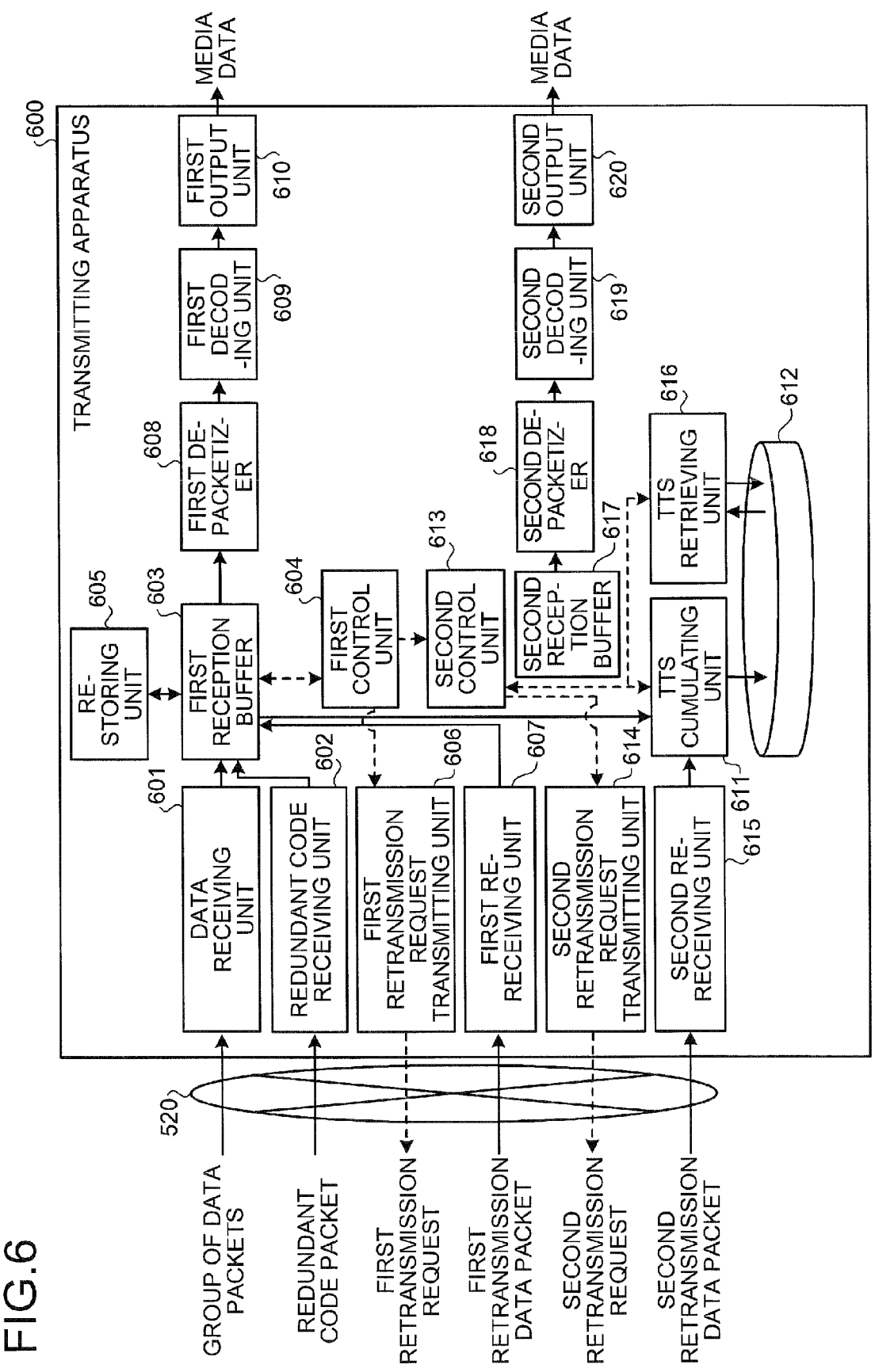
FIG. 6 is a block diagram of a functional configuration of a receiving apparatus.

FIG. 6 is a block diagram of a functional configuration of a receiving apparatus. As depicted in FIG. 6, the receiving apparatus 600 includes a data receiving unit 601, a redundant code receiving unit 602, a first reception buffer 603, a first control unit 604, a restoring unit 605, a first retransmission request transmitting unit 606, a first re-receiving unit 607, a first de-packetizer 608, a first decoding unit 609, a first output unit 610, a TTS cumulating unit 611, a cumulating medium 612, a second control unit 613, a second retransmission request transmitting unit 614, a second re-receiving unit 615, a TTS retrieving unit 616, a second reception buffer 617, a second de-packetizer 618, a second decoding unit 619, and a second output unit 620.

The data receiving unit 601 receives data packets transmitted from the transmitting apparatus 500 via the network 520. The data receiving unit 601 outputs the data packets to the first reception buffer 603. The redundant code receiving unit 602 receives the redundant code packets transmitted from the transmitting apparatus 500 via the network 520. The redundant code receiving unit 602 outputs the redundant code packets to the first reception buffer 603.

The first reception buffer 603 temporarily stores the data packets coming from the data receiving unit 601 and the redundant code packets coming from the redundant code receiving unit 602. The first reception buffer 603 also temporarily stores the retransmitted data packets coming from the first re-receiving unit 607. The first reception buffer 603 outputs the stored data packets to the first de-packetizer 608 under the control of the first control unit 604.

The first control unit 604 controls overall operations of the receiving apparatus 600. For example, the first control unit 604 controls output timing of the first output unit 610. A period beginning when the data receiving unit 601 receives the data packets until the output timing of the first output unit 610 is short enough (for example, 400 ms) not to compromise the real time characteristic. Hereinafter, detailed operation of the first control unit 604 is explained.

The first control unit 604 detects a missing packet(s) that the transmitting apparatus 500 has transmitted but the data receiving unit 601 has not received, based on the data packets stored in the first reception buffer 603. For example, the first control unit 604 detects the missing packet based on the sequence numbers of the data packets stored in the first reception buffer 603. Since the data packets have consecutive sequenced numbers, checking the continuity of the sequence numbers reveals the missing packets.

Finding a missing packet, the first control unit 604 determines whether the missing packet can be restored using the redundant code packets stored in the first reception buffer 603. If the first control unit 604 determines that the missing packet can be restored, the first control unit 604 controls the restoring unit 605 and restores the missing packet. The restoring unit 605 generates a data packet equivalent to the missing packet based on a calculation using the data packets and the redundant code packets stored in the first reception buffer 603.

The restoring unit 605 stores the restored packets in the first reception buffer 603. If the first control unit 604 detects a missing packet but determines that the missing packet cannot be restored with the redundant code packets, the first control unit 604 outputs information concerning the missing packet to the first retransmission request transmitting unit 606. The first retransmission request transmitting unit 606 transmits to the transmitting unit 500 a retransmission request (a first retransmission request) for the missing packet(s) indicated by the information output from the first control unit 604.

The first re-receiving unit 607 receives a data packet (the first retransmitted data packet) sent from the transmitting apparatus 500 in response to the first retransmission request from the first retransmission request transmitting unit 606. The first re-receiving unit 607 outputs the data packet to the first reception buffer 603.

The first control unit 604 waits for the first stand-by period starting at transmission of the first retransmission request by the first retransmission request transmitting unit 606 until the first re-receiving unit 607 receives the first retransmission data packet transmitted by the transmitting apparatus 500 in response to the first retransmission request. For example, the first control unit 604 monitors the data packets stored in the first reception buffer 603 and determines whether the first retransmission data packet has been received.

The first stand-by period is short enough (for example, 300 ms) to end before the output timing of the first output unit 610. The first control 604 instructs the first reception buffer 603 to output the data packets stored in the first reception buffer 603 to the first de-packetizer 608 at the output timing of the first output unit 610, and detects for a missing packet again.

If the first retransmission data packet is not received during the first stand-by period even if the first retransmission request has been transmitted, the first control unit 604 detects a data packet corresponding to the first retransmission request as a missing packet. The first control unit 604 also detects a missing packet based on the sequence numbers of the data packets stored in the first reception buffer 603. Detecting a missing packet at the output timing of the first output unit 610, the first control unit 604 outputs an instruction for a second retransmission to the second control unit 613.

The first de-packetizer 608 de-packetizes the data packets from the first control unit 604 and generates original encoded data. The first de-packetizer 608 combines data stored in each data packet such that the sequence numbers of the data packets are sequential to obtain the original encoded data. The first de-packetizer 608 outputs the de-packetized data to the first decoding unit 609.

The first decoding unit 609 decodes the data from the first de-packetizer 608 to obtain the original media data. The first decoding unit 609 outputs the decoded media data to the first output unit 610. The first output unit 610 outputs the media data output from the first decoding unit 609. In this way, the media data of the data packets received by the data receiving unit 601 is output in real time.

In the output timing of the first output unit 610, the TTS cumulating unit 611 obtains the data packets stored in the first reception buffer 603 and converts the data packets to TTS packets. The TTS cumulating unit 611 converts the data packets from the second re-receiving unit 615 to TTS packets. The cumulating unit 611 stores each TTS packet in the cumulating medium 612. The cumulating medium 612 stores the TTS packets as a transport stream.

The second control unit 613 controls the output timing of the second output unit 620. When the first control unit 604 outputs an instruction for a second retransmission, the second control unit 613 instructs the TTS retrieving unit 616 to retrieve a missing TTS packet in the transport stream stored in the cumulating medium 612. The second control unit 613 outputs information indicating the time stamp of the retrieved TTS packet to the second retransmission request transmitting unit 614.

The second retransmission request transmitting unit 614 transmits to the transmitting unit 500 via the network 520, as the second retransmission request, a retransmission request for the TTS packet identified by the time stamp in the information output from the second control unit 613. The second re-receiving unit 615 receives a TTS packet (the second retransmission data packet) transmitted from the transmitting apparatus 500 in response to the second retransmission request from the second retransmission request transmitting unit 614, and outputs the TTS packet to the TTS cumulating unit 611.

The second control unit 613 waits the period A starting from the transmission of the second retransmission request by the second retransmission request transmitting unit 614 until the TTS packet transmitted by the transmitting apparatus 500 in response to the second retransmission request is received. For example, the second control unit 613 instructs the TTS retrieving unit 616 to retrieve transport streams stored in the cumulative medium 612 to determine whether the second retransmission data packet has been received.

Receiving the TTS packets, the second re-receiving unit 615 may inform the second control unit 613 of the reception of the TTS packets. The period A, from the transmission of the second retransmission request until the reception of the second retransmission data packet, is long enough (for example, two minutes) for the second re-receiving unit 615 to surely receive the second re-transmission data packet from the transmitting apparatus 500 in response to the second retransmission request except, for example, when a failure occurs in the network 520.

The second control unit 613 instructs the TTS retrieving unit 616 to retrieve transport streams stored in the cumulating medium 612 at the output timing of the second output unit 620. The TTS retrieving unit 616 stores the retrieved TTS packets in the second reception buffer 617. The second control unit 613 instructs the second reception buffer 617 to output the TTS packets stored in the second reception buffer 617 to the second de-packetizer 618.

The second de-packetizer 618 de-packetizes the TTS packets output from the second reception buffer 617 to generate the original encoded data. The second de-packetizer 618 combines the data stored in each data packet such that the sequence numbers of the data packets are sequential to obtain the original encoded data. The second de-packetizer 618 outputs the de-packetized data to the second decoding unit 619.

The second decoding unit 619 decodes the encoded data from the second de-packetizer 618 to obtain the original media data. The second decoding unit 619 outputs the decoded data to the second output unit 620. The second output unit 620 outputs the media data from the second decoding unit 619. In this way, the media data is corrected with the second retransmission data packets that are received by the period A being adequately set.

Figure 7:
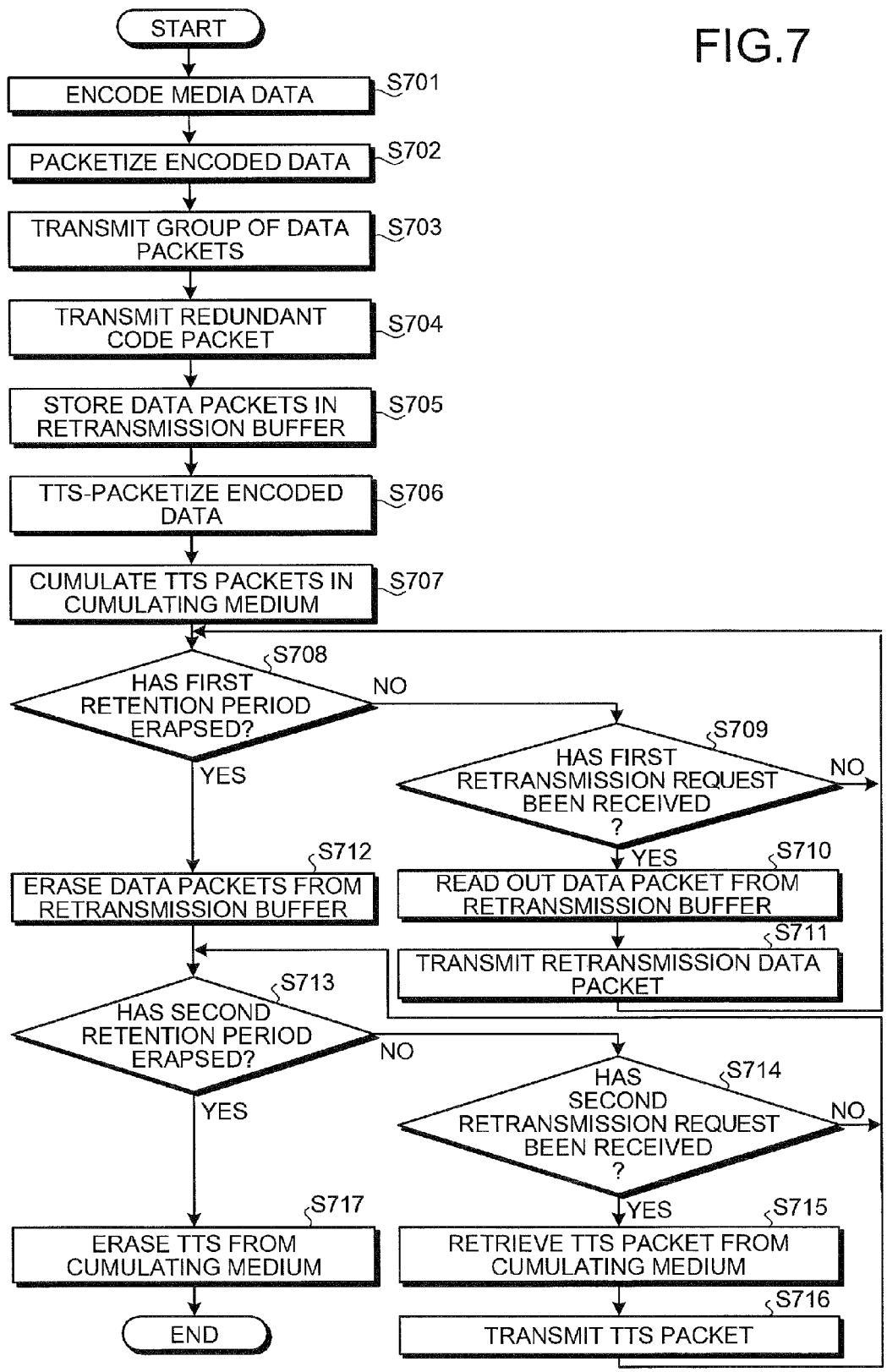
FIG. 7 is a flowchart of one example of operation by the transmitting apparatus depicted in FIG. 5.

FIG. 7 is a flowchart of one example of operation by the transmitting apparatus depicted in FIG. 5. The encoding unit 501 encodes media data (step S701). The packetizer 502 packetizes the data encoded at step S701 (step S702). The data transmitting unit 503 transmits the data packets packetized at step S702 (step S703).

The redundant code generating unit 504 generates a redundant code packet based on the data packets packetized at step S702, and the redundant code transmitting unit 505 transmits the redundant code packet (step S704). The retransmission buffer 506 stores the data packets packetized at step S702 (step S705).

The packetizer 502 packetizes the data encoded at step S701 to generate TTS packets (step S706). The TTS cumulating unit 510 stores, as a transport stream, the TTS packets packetized at step S706 in the cumulating medium 511 (step S707).

It is determined whether the first retention period has elapsed from the transmission of the data packets at step S703 (step S708). If the first retention period has not elapsed (step S708: NO), it is determined whether the first retransmission request receiving unit 507 has received the first retransmission request (step S709). If the first retransmission request receiving unit 507 has not received the first retransmission request (step S709: NO), the flow returns to the step S708.

If the first retransmission request receiving unit 507 has received the first retransmission request at step S709 (step S709: YES), data packets identified by the first retransmission request are read out from the retransmission buffer 506 (step S710). The data packets read out at step S710 are, as the retransmission data packets, transmitted to the receiving apparatus 600 (step S711); the flow returns to the step S708.

If the first retention period has elapsed (step S708: YES), the data packets stored at step S705 are erased from the retransmission buffer 506 (step S712). It is determined whether the second retention period has elapsed since transmission of the data packets at step S703 (step S713).

If the second retention period has not elapsed (step S713: NO), it is determined whether the second retransmission request receiving unit 512 has received the second retransmission request (step S714). If the second retransmission request receiving unit 512 has not received the second retransmission request (step S714: NO), the flow returns to the step S713.

If the second retransmission request has been received at step S714 (step S714: YES), a TTS packet corresponding to the second retransmission request is retrieved from the cumulating medium 511 (step S715). The TTS packet retrieved at step S715 is transmitted to the receiving apparatus 600 (step S716) and the flow returns to step S713.

If the second retention period has elapsed at step S713 (step S713: YES), the transport stream stored at step S707 is erased from the cumulating medium 511 (step S717); the process for the media data is terminated. The process above is repeated each time media data is input; thereby the media data is transmitted to the receiving apparatus 600.

Figure 8A:
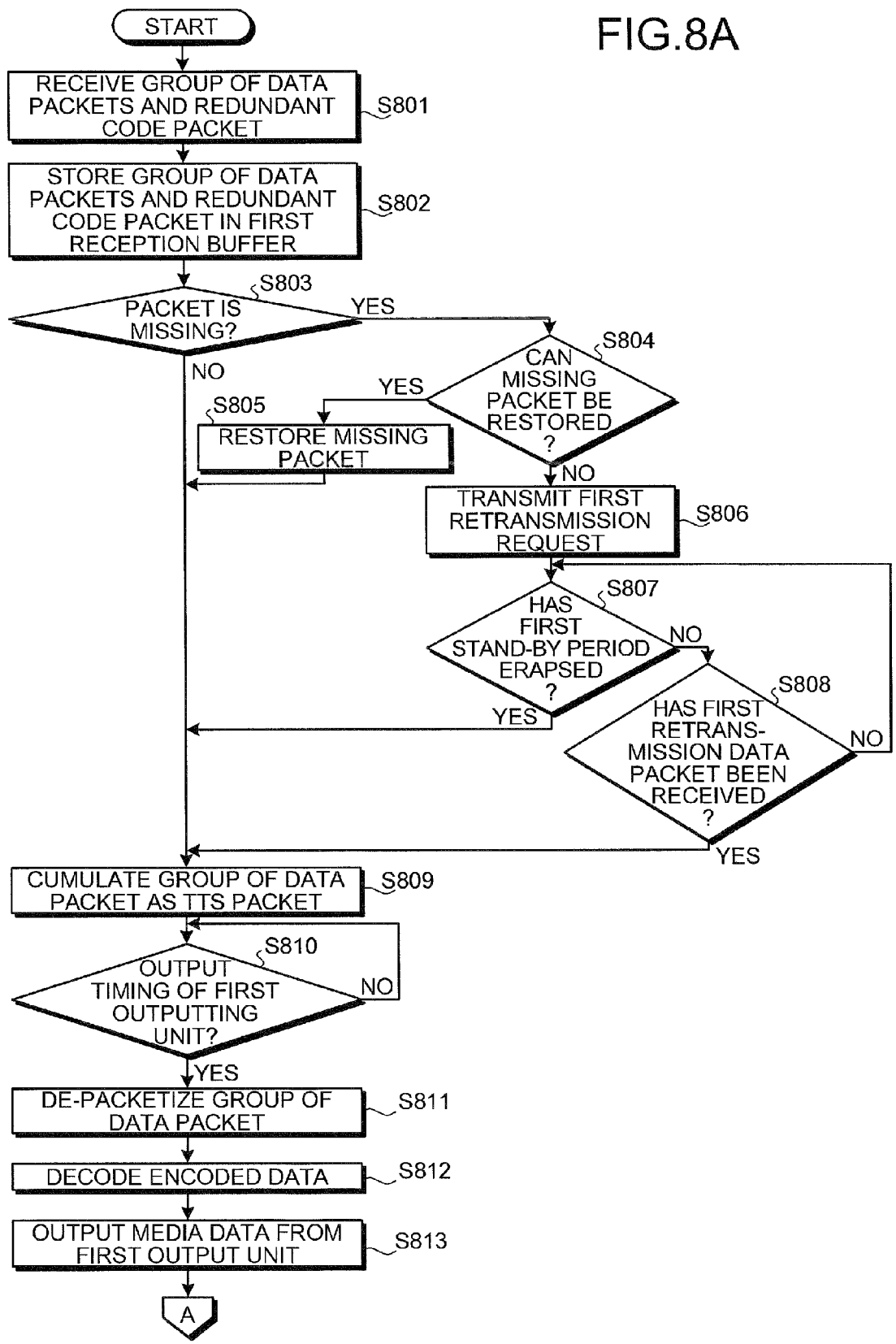
FIG. 8A is a flowchart of one example of operation by the receiving apparatus depicted in FIG. 6.
Figure 8B:
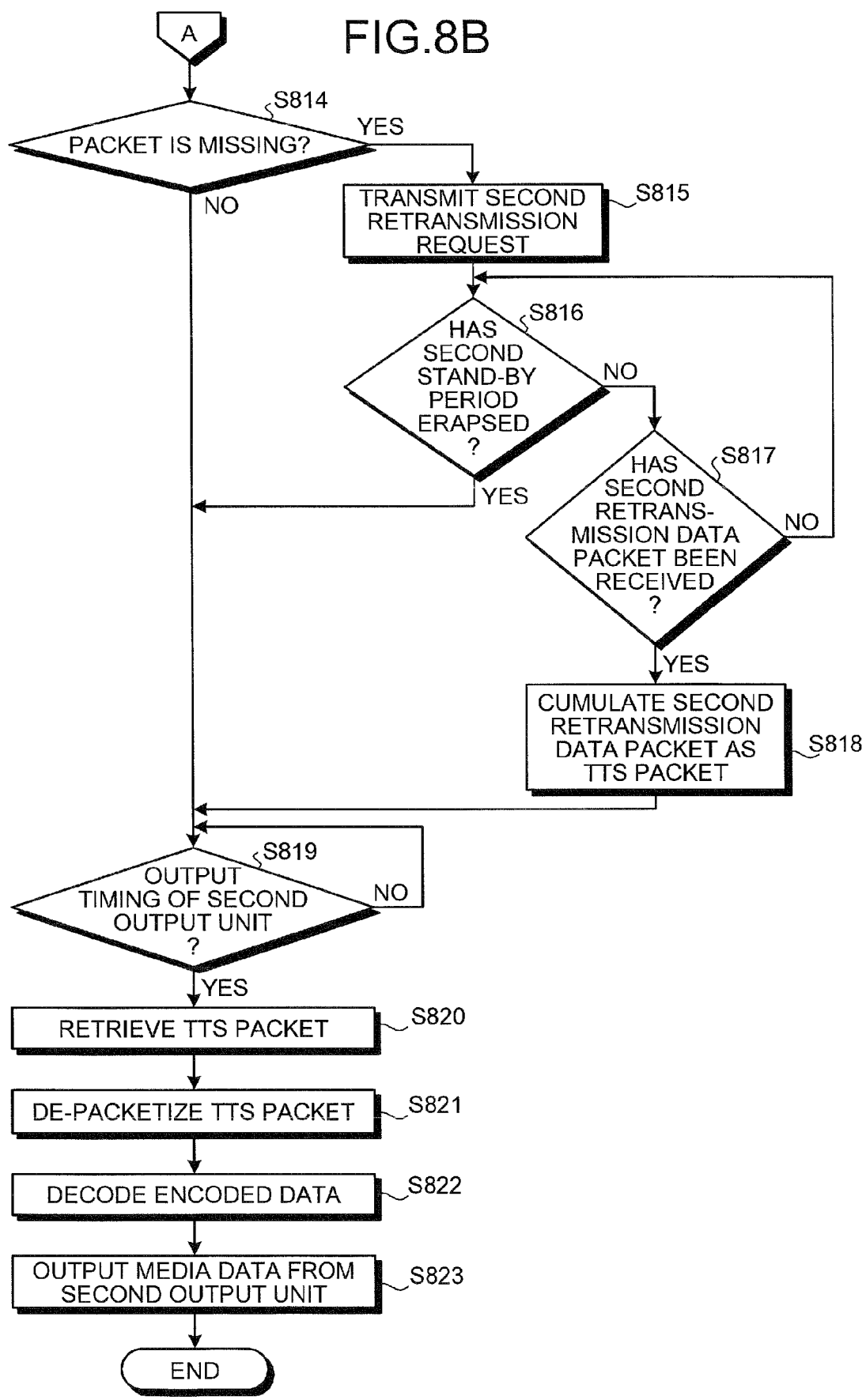
FIG. 8B is another flowchart of one example of the operation by the receiving apparatus depicted in FIG. 6.

FIG. 8A is a flowchart of one example of operation by the receiving apparatus depicted in FIG. 6. FIG. 8B is another flowchart of one example of the operation by the receiving apparatus depicted in FIG. 6. As depicted in FIG. 8A, data packets and redundant code packets transmitted from the transmitting apparatus 500 are received (step S801).

The data packets and the redundant code packets received at step S801 are stored in the first reception buffer 603 (step S802). It is determined whether packets are missing based on each data packet stored in the first reception buffer 603 at step S802 (step S803).

If there is a missing packet (step S803: YES), it is determined whether the missing packet can be restored with use of the redundant code packets stored at step S802 (step S804). If the missing packet can be restored (step S804: YES), the missing packet is restored (step S805) and the flow proceeds to step S809.

If the missing packet cannot be restored at step S804 (step S804: NO), the first retransmission request is sent to the transmitting apparatus 500 (step S806). It is determined whether the first stand-by period has elapsed since the transmission of the retransmission request at step S806 (step S807). If the first stand-by period has elapsed (step S807: YES), the flow proceeds to step S809.

If the first stand-by period has not elapsed (step S807: NO), it is determined whether a first retransmission data packet has been received (step S808). If the first retransmission data packet has not been received (step S808: NO), the flow returns to step S807. If the first retransmission data packet has received (step S808: YES), the flow proceeds to step S809.

If there is no missing packet (step S803: NO), the data packets stored in the first reception buffer 603 are converted to TTS packets and stored in the cumulating medium 612 (step S809). It is determined whether the output timing of the first output unit 610 has come (step S810) and the output timing of the first output unit 610 is waited for (step S810: the loop of NO).

When the output timing of the first output unit 610 comes (step S810: YES), the data packets stored in the first reception buffer 603 are de-packetized and the original encoded data is generated (step S811). The data de-packetized at step S811 is decoded (step S812). The first output unit 610 outputs the media data (step S813).

The flow proceeds to step S814 depicted in FIG. 8B (reference sign A). It is determined whether there is a missing packet (step S814). For example, if the flow has gone through the YES branch of step S807, it is determined that there is a missing packet since the first retransmission data packet corresponding to the first retransmission request has not been received. If the flow has gone through the NO branch of step S803, step S805 or step S807, it is determined that there is no missing packet.

If there is a missing packet (step S814: YES), the second retransmission request is transmitted (step S815). It is determined whether the second stand-by period has elapsed since the transmission of the first retransmission request at step S806 (or the period A has elapsed since S815) (step S816). If the second stand-by period has elapsed (step S816: YES), the flow proceeds to step S819.

If the second stand-by period has not elapsed (step S816: NO), it is determined whether the second retransmission data packet has been received (step S817). If the second retransmission data packet has not been received (step S817: NO), the flow returns to step S816. If the second retransmission data packet has been received (step S817: YES), the second retransmission data packet is stored as a TTS packet (step S818) and the flow proceeds to step S819.

If there is no missing packet (step S814: NO), it is determined whether the output timing of the second output unit 620 has come (step S819), and the output timing is waited for (step S819: loop of NO). When the output timing of the second output unit 620 comes (step S819: YES), the TTS packet is retrieved (step S820).

The TTS packet retrieved at step S820 is de-packetized and the original encoded data is generated (step S821). The data de-packetized at step S821 is decoded (step S822). The second output unit 620 outputs the media data (step S823), and the process is terminated.

FIG. 9 is a diagram of one example of the transmitting apparatus and the receiving apparatus. The transmitting apparatus 500 depicted in FIG. 5 and the receiving apparatus 600 depicted in FIG. 6 can be applied to a communications system 900 depicted in FIG. 9. The communications system 900 includes a local station 910 and a central key station 920. The local station 910 transmits media data through the network 520.

The local station 910 includes a tape deck 911, a TV monitor 912, and the transmitting apparatus 500. In the local station 910, the media data played by the tape deck 911 is displayed at the TV monitor 912 and at the same time is input to the transmitting apparatus 500. The transmitting apparatus 500 sequentially packetizes the media data being played by the tape deck 911.

The central key station 920 includes the receiving apparatus 600, TV monitors 921 and 923, and tape decks 922 and 924. The TV monitor 921 and the tape deck 922 are connected to the first output unit 610 of the receiving apparatus 600. The TV monitor 921 displays in real time the media data being received by the receiving apparatus 600.

The TV monitor 923 and the tape deck 924 are connected to the second output unit 620 of the receiving apparatus 600. The TV monitor 923 displays, with a certain delay, high-quality media data the contents of which are identical to that of the media data displayed at the TV monitor 921. The tape deck 924 records, with a certain delay, high-quality media data the contents of which are identical to that of the media data recorded in the tape deck 922.

For example, the central key station 920 displays, at TV monitor 921 in real time, media data of broadcast material or footage transmitted from the local station 210 and builds a rough cut taken from the media data recorded in the tape deck 922. The term "rough cut" means selecting and splicing shots before a final cut, which is editing for actual broadcasting.

The contents of the media data output respectively from the first output unit 610 and the second output unit 620 are identical, and the information concerning a play point that is included in the media data is shared. Therefore, the rough cut of the media data recorded in the tape deck 922 can also be used for the high-quality media data recorded in the tape deck 924.

As a result, the editing of footage in real time can be reflected in the high-quality media data recorded in the tape deck 924. For example, the media data is assumed to be a ten-minute piece of video footage. Further assume that watching the video footage played on the TV monitor 921 in real time, a user removes a segment ranging from an initial point (0 minute) to a three-minute point.

The user, after a certain delay (for example, two minutes), edits the video footage recorded in the tape deck 924 without watching the content of this footage to remove the segment. In this way, a user can swiftly edit and obtain high-quality video footage.

FIG. 10 is a diagram of communications under the communications system depicted in FIG. 9. An arrow 1010 indicates data packet flow from the data transmitting unit 503 and the first retransmitting unit 509 of the transmitting apparatus 500 to the receiving apparatus 600. The arrow 1010 further indicates successful transmission of all the media data.

For example, it is assumed that the media data is a ten-minute piece of video footage. The transmission of the media data from the transmitting apparatus 500 to the receiving apparatus 600 while the media data is played at the tape deck 911 completes for about 10 minutes. An arrow 1020 indicates that the transmitting apparatus 500 cumulates the TTS packets in the cumulating medium 511. An arrow 1030 indicates that the receiving apparatus 600 cumulates in the cumulating medium 612, the TTS packets, the contents of which are identical to the received data packets.

Figure 11:
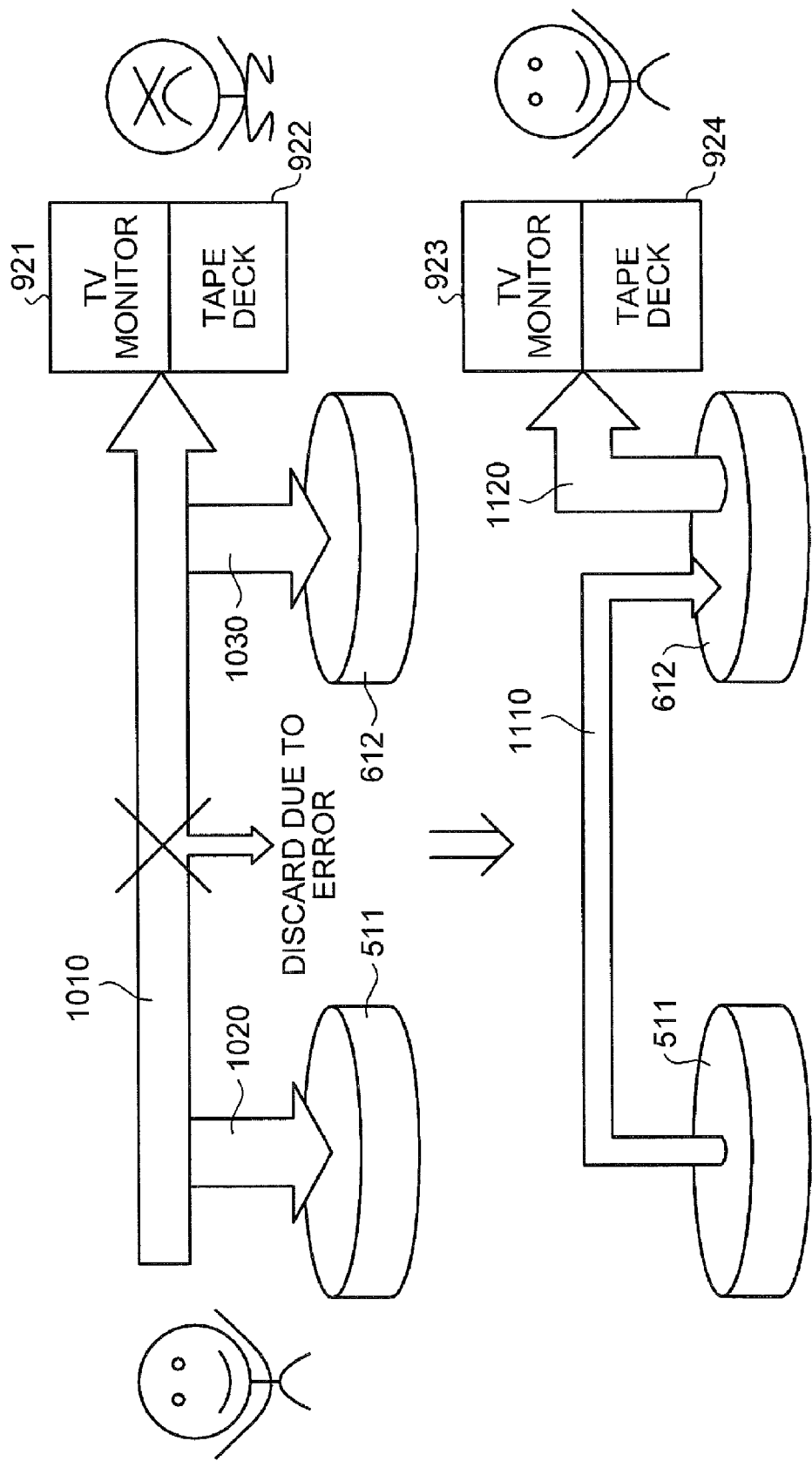
FIG. 11 is another diagram illustrating communications under the communications system depicted in FIG. 9.

FIG. 11 is another diagram illustrating communications under the communications system depicted in FIG. 9. In FIG. 11, parts identical to those depicted in FIG. 10 are given identical reference signs and explanation thereof is omitted. An arrow 1010 indicates that not all media data are successfully transmitted from the data transmitting unit 503 and the first retransmitting unit 509.

Although the arrow 1010 indicates that the first retransmission request transmitting unit 606 of the receiving apparatus 600 transmitted the first retransmission request to the transmitting apparatus 500, errors occurred in the first retransmission data packet transmitted from the first retransmitting unit 509 of the transmitting apparatus 500 in response to the request, whereby the first retransmission data packet has been discarded (discard by error).

A conventional transmitting apparatus and receiving apparatus erases data packets from a buffer of the transmitting apparatus after a retention period for a retransmission request has elapsed. As a consequence, when the retransmission request fails, all the media data must be re-packetized and transmitted again from the beginning. If a ten-minute piece of video footage is to be transmitted, the video footage must be transmitted again taking ten more minutes after the failure.

On the other hand, the transmitting apparatus 500 includes, in addition to the retransmission buffer 506, the cumulating medium 511 that cumulates the media data as a transport stream over an extended period of time. As a result, even after a period for receiving the first retransmission request elapses, the second retransmission request is received and the second retransmission data packet is transmitted as a TTS packet.

An arrow 1110 indicates that the transmitting apparatus 500 transmits the second retransmission data packet to the receiving apparatus 600. An arrow 1120 indicates output of data corresponding to TTS packets sent as the second retransmission data packet and TTS packets stored in the cumulating medium 612.

Figure 12:
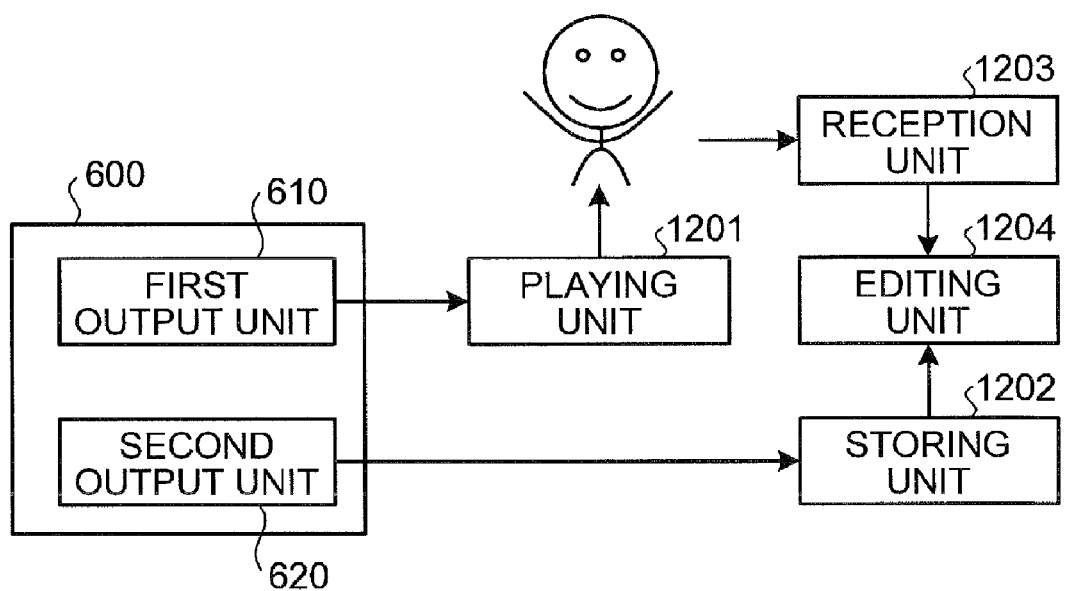
FIG. 12 is a diagram of another example of the receiving apparatus.

FIG. 12 is a diagram of another example of the receiving apparatus. In FIG. 12, elements identical to those depicted in as FIG. 6 are given identical reference numerals and explanation thereof is omitted. Units of the receiving apparatus 600 other than the first output unit 610 and the second output unit 620 are omitted here. As depicted in FIG. 12, the receiving apparatus 600 includes a playing unit 1201, a storing unit 1202, a reception unit 1203, and an editing unit 1204.

The playing unit 1201 plays the media data output from the first output unit 610. While watching the media data played by the playing unit 1201, a user inputs an instruction concerning editing of the data into the reception unit 1203. The playing unit 1201 may be, for example, a monitor that displays video footage, a speaker that outputs audio, etc.

The storing unit 1202 stores the data output from the second output unit 620. The reception unit 1203 receives instructions concerning editing from the user. The reception unit 1203 outputs the instructions to the editing unit 1204. The editing unit 1204 edits the media stored in the storing unit 1202 based on the instructions from the reception unit 1203.

For example, it is assumed that the media data is a ten-minute piece of video footage. Also assume that the user inputs an instruction to remove a segment ranging from an initial point (0 minute) to a three-minute point, watching the video footage played on the playing unit 1201. In this case, the editing unit 1204 erases the segment ranging from an initial point (0 minute) to a three-minute point from the video footage stored in the storing unit 1202.

When instructions are input from the reception unit 1203 while a corresponding part of the video footage has not yet been stored in the storing unit 1202, the editing unit 1204 starts editing the video footage after that part is stored in the storing unit 1202. An instruction received by the reception unit 1203 is not limited to removal of part of video footage but may include a change of brightness, chroma, slant, or dimensions of the video footage. When the audio is added to the video footage, the instruction may be a change of sound volume.

As explained above, the receiving apparatus 600 enables acquisition of data in real time from the first output unit 610 and also acquisition of high-quality data from the second output unit 620. Therefore, high-quality data is assured and the contents of the data are swiftly recognized.

Data respectively output from the first output unit 610 and the second output unit 620 are data based on packets received through one transmission path. Therefore, in comparison with a parallel usage of a receiving apparatus for obtaining low-quality data in real time and a receiving apparatus for obtaining high-quality data, the above embodiments approximately halves the transmission volume.

Further, compared with two receiving apparatuses, one receiving apparatus saves space and cost. Furthermore, the parallel use of two receiving apparatus also requires two transmitting apparatus but the receiving apparatus 600 reduces the transmitting apparatus at a transmitting side to one. As a result, the transmitting side also benefits from a saving of space and cost.

Furthermore, the first retransmission request transmitting unit 606 and the first re-receiving unit 607 perform a retransmission process in a shorter period of time, and a result of the process is output from the first output unit 610. The output from the first output unit 610 does not lose the real time characteristic, and also the quality of the output from the first output unit 610 is improved.

Furthermore, the second retransmission request transmitting unit 614 and the second re-receiving unit 615 perform a retransmission process over a longer period of time, and a result of the process is output from the second output unit 620. The output from the first output unit 610 does not lose the real time characteristic, and also the quality of the output from the second output unit 620 is improved.

Especially when the received data is media data, high-quality data is obtained and the contents of the media data are quickly recognized, thereby realizing swift completion high-quality edited media data. Furthermore, since the first output unit 610 and the second output unit 620 output media data including information concerning a common point to start playing the media data, the editing of the output from the first output unit 610 is easily applied to the output from the second output unit 620.

Furthermore, while the media data from the first output unit 610 is played, instructions concerning editing of the media data are received from a user and the media data from the second output unit 620 is edited based on the instructions. As a result, the user only has to edit the played media data to swiftly complete high-quality media data (see FIG. 12).

Additionally, elimination of the necessity of long-term storage of packets on a transmitting side curbs the increase in the amount of packets stored in a retransmission buffer on the transmission side. As a result, a retrieval rate of packets in response to a retransmission request does not slow down and the size of a buffer is not huge.

According to the embodiments above, without an increase in transmission volume, high-quality data is obtained and the contents of the data are quickly recognized. In the explanation above, the second output unit 620 outputs the same contents as the first output unit 610; however, the second output unit 620 may output only higher quality portions of the data with respect to the data of the first output unit 610.

For example, the second output unit 620 outputs only data that corresponds to the data packet received by the second re-receiving unit 615. In this case, a storing unit that stores data from the first output unit 610 may be installed so that data stored in the storing unit is automatically corrected based on data output from the second output unit 620.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A receiving apparatus comprising:
a receiving unit that receives a group of packets from a transmitting apparatus;
a detecting unit that detects a missing packet based on the group of packets;
a first output unit that outputs data corresponding to the group of packets, irrespective of a detection result obtained by the detecting unit;
a transmitting unit that transmits to the transmitting apparatus, a request for retransmission of the missing packet;
a re-receiving unit that receives a packet retransmitted from the transmitting apparatus in response to the request; and
a second output unit that outputs data corresponding to the group of packets and the packet received by the re-receiving unit.

2. The receiving apparatus according to claim 1, wherein
the receiving unit receives a group of packets in sequence, the packets being packetized media data including at least one among video data and audio data;
the first output unit outputs, for each group of the packets received by the receiving unit, first media data corresponding to the packets; and
the second output unit outputs second media data corresponding to the group of the packets received by the receiving unit and the packet received by the re-receiving unit.

3. The receiving apparatus according to claim 2, wherein
the first output unit and the second output unit output media data including information concerning a common play point.

4. The receiving apparatus according to claim 1, further comprising
a selecting unit that selects, for output from the receiving apparatus, the data output from the first output unit or the data output from the second output unit.

5. The receiving apparatus according to claim 1, further comprising:
a playing unit that plays the data output from the first output unit;
a reception unit that receives an instruction concerning editing of the data played; and
an editing unit that edits the data output from the second output unit based on the instruction.

6. A receiving apparatus comprising:
a receiving unit that receives a group of packets transmitted from a transmitting apparatus;
a first detecting unit that detects, based on the group of packets, packets that have not been received by the receiving unit;
a first transmitting unit that transmits to the transmitting apparatus, a first request for retransmission of the packets that have not been received by the receiving unit;
a first re-receiving unit that receives packets retransmitted from the transmitting apparatus in response to the first request;
a second detecting unit that detects, based on the packets received by the first re-receiving unit, a packet that has not been received by the first re-receiving unit and for which retransmission has been requested;
a first output unit that outputs data corresponding to the group of packets and the packets received by the first re-receiving unit, irrespective of a detection result obtained by the second detecting unit;
a second transmitting unit that transmits to the transmitting apparatus, a second request for retransmission of the packet that has not been received by the first re-receiving unit;
a second re-receiving unit that receives a packet retransmitted from the transmitting apparatus in response to the second request; and
a second output unit that outputs the data corresponding to the group of packets, the packets received by the first re-receiving unit, and the packet received by the second re-receiving unit.

7. The receiving apparatus according to claim 6, wherein
the first output unit outputs the data corresponding to the packets that the first re-receiving unit receives within a first stand-by period commencing when the first transmitting unit transmits the first request, and
the second output unit outputs the data corresponding to the packet that the second re-receiving unit receives within a second stand-by period that commences when the first transmitting unit transmits the first request until and is longer than the first stand-by period.

8. A receiving method comprising:
receiving a group of packets from a transmitting apparatus;
detecting a missing packet based on the group of packets;
outputting data corresponding to the group of packets, irrespective of a detection result obtained at the detecting;
transmitting to the transmitting apparatus, a request for retransmission of the missing packet;
re-receiving a packet retransmitted from the transmitting apparatus in response to the request; and
outputting the data corresponding to the group of packets and the packet received at the re-receiving of the packet.

* * * * *